Figure 1:
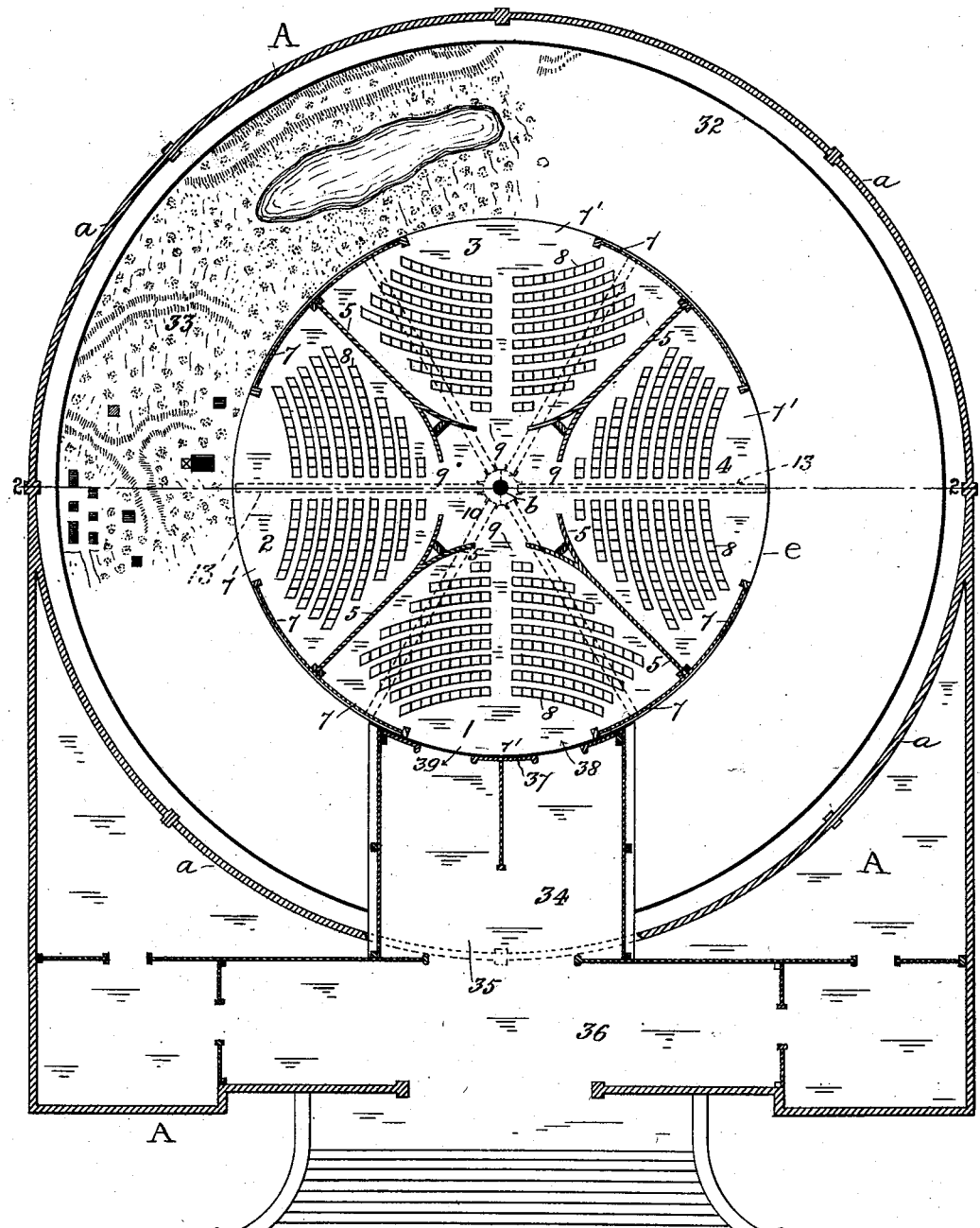

No. 754,532. PATENTED MAR. 15, 1904.
E. J. AUSTEN & H. A. BRADWELL.
SCENOGRAPHIC APPARATUS.
APPLICATION FILED JAN. 24, 1903.
NO MODEL. 3 SHEETS—SHEET 1.

WITNESSES
INVENTORS

No. 754,532. PATENTED MAR. 15, 1904.
E. J. AUSTEN & H. A. BRADWELL.
SCENOGRAPHIC APPARATUS.
APPLICATION FILED JAN. 24, 1903.
NO MODEL. 3 SHEETS—SHEET 2.
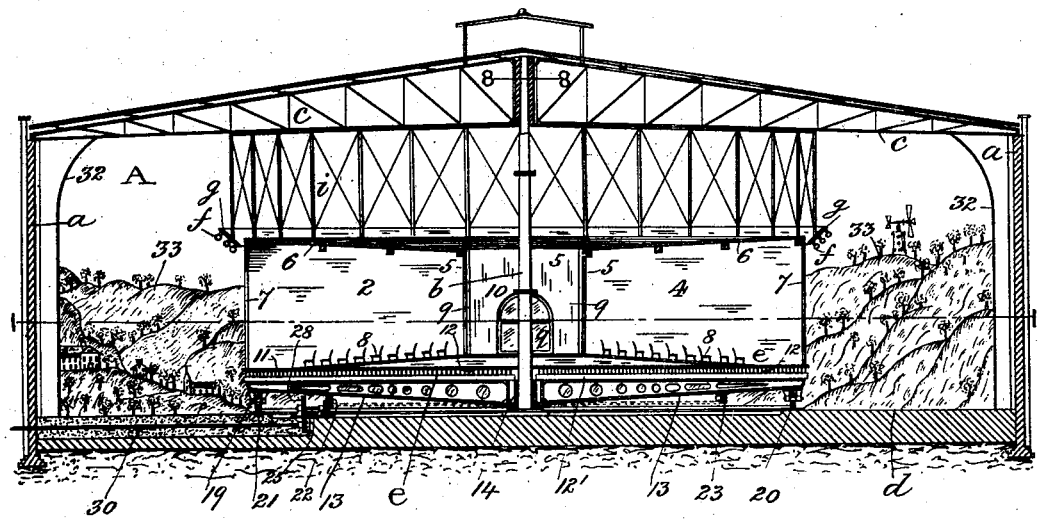

No. 754,532. PATENTED MAR. 15, 1904.
E. J. AUSTEN & H. A. BRADWELL.
SCENOGRAPHIC APPARATUS.
APPLICATION FILED JAN. 24, 1903.
NO MODEL. 3 SHEETS—SHEET 3.
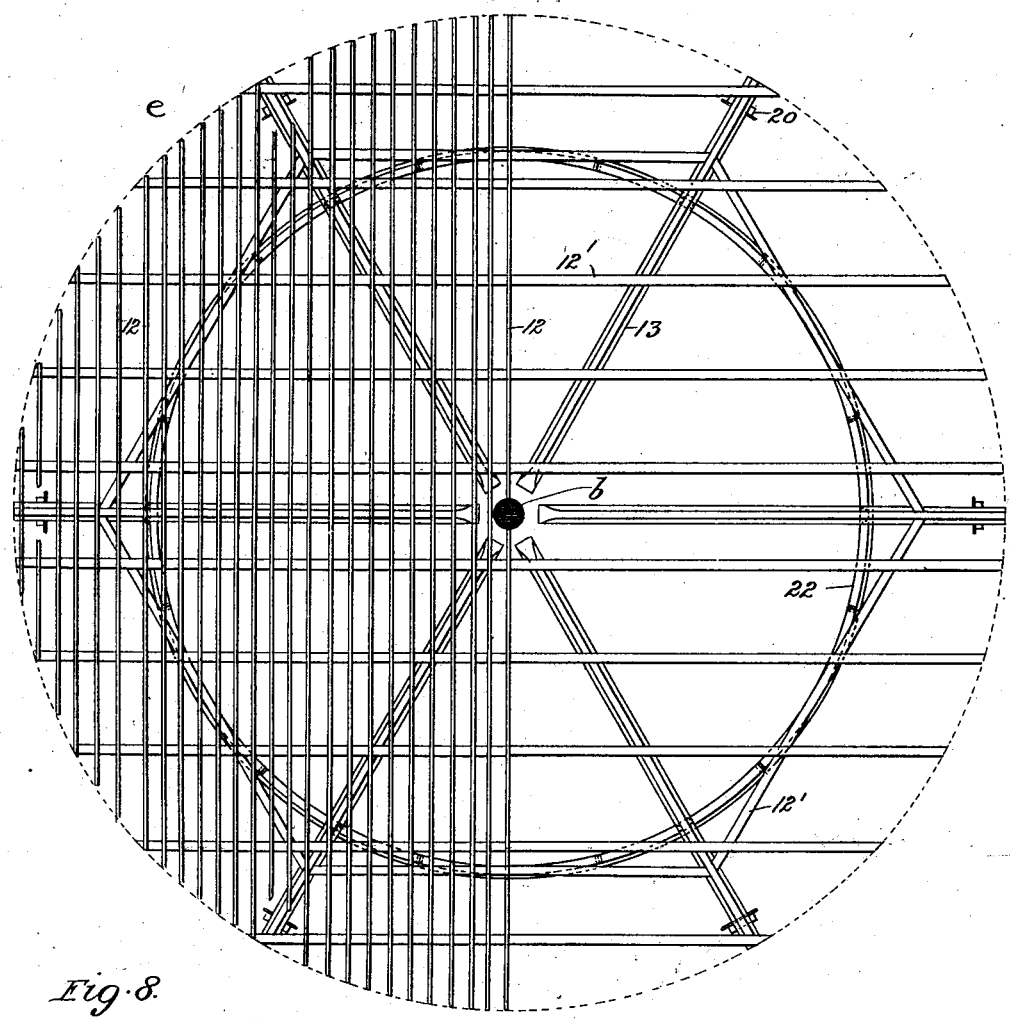
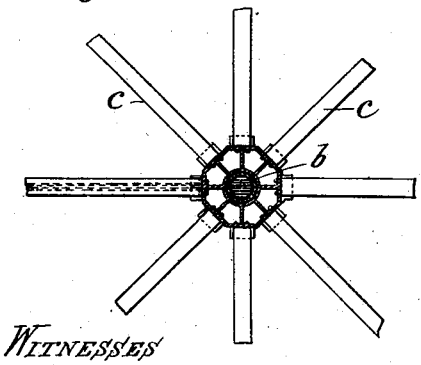
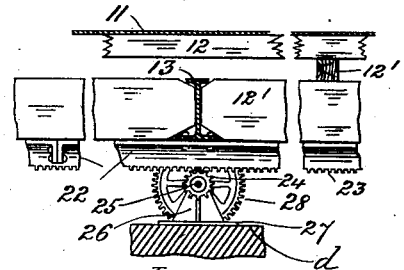

No. 754,532. Patented March 15, 1904.

UNITED STATES PATENT OFFICE.

EDWARD J. AUSTEN, OF ST. LOUIS, MISSOURI, AND HERBERT A. BRADWELL, OF CONEY ISLAND, NEW YORK.

SCENOGRAPHIC APPARATUS.

SPECIFICATION forming part of Letters Patent No. 754,532, dated March 15, 1904.

Application filed January 24, 1903. Serial No. 140,413. (No model.)

*To all whom it may concern:*

Be it known that we, EDWARD J. AUSTEN, a subject of the King of Great Britain, residing at St. Louis, in the State of Missouri, and HER-BERT A. BRADWELL, a citizen of the United States, residing at Coney Island, in the county of Kings and State of New York, have invented a new and useful Improvement in Scenographic Apparatus, of which the following is a specification.

Our invention relates to scenographic apparatus, and has for its object to present to the view of a spectator in the auditorium of a theater an uninterrupted successive change of scenery similar to that presented to the spectator when traveling in a railroad-car, boat, or other vehicle.

The invention consists in features of novelty, as hereinafter described and claimed, reference being had to the accompanying drawings, forming part of this specification, whereon—

Figure 1 is a horizontal section on line 1 1 in Fig. 2 through a theater containing our improved scenographic apparatus; Fig. 2, a vertical section thereof on line 2 2 in Fig. 1; Fig. 3, a detached view, to enlarged scale, of the central portion of the circular platform forming part of our invention as seen in Fig. 2; Fig. 4, a top plan thereof broken away; Fig. 5, a detached view, to enlarged scale, of the peripheral portion of the circular platform as seen in Fig. 2; Fig. 6, a top plan thereof broken away; Fig. 7, a top plan, to enlarged scale, corresponding to that seen in Fig. 1 of the supporting girders and framework of the circular platform and its appendages, omitting the flooring and central portion; Fig. 8, a horizontal section, to enlarged scale, on line 8 8 in Fig. 2 through the upper part of the central column, showing the roof-trusses broken away, radiating therefrom; and Fig. 9, a detail view, to enlarged scale, of the toothed ring fixed to the under sides, of the platform-girders with its engaging gear for rotating the platform.

Like letters and numerals of reference denote like parts in all the figures.

A represents a theater having the outer surrounding wall $a$ and containing, preferably, a central column $b$, from which the roof-trusses $c$, fixed thereto at their inner ends, radiate and are supported at their outer ends by the wall $a$. The column $b$ is formed with a base-plate $b'$, which is preferably integral with the body for insuring an extended and solid bearing on the floor $d$ of the theater A. At a suitable height from the floor $d$, preferably around and concentric with the central column $b$, is arranged a circular platform $e$, on which are erected one or more (preferably four, as shown) auditoriums 1 2 3 4, inclosed, respectively, by walls 5 and a roof or ceiling 6 and having its proscenium 7 preferably alined or parallel to the periphery of the platform $e$, each auditorium 1 2 3 4 containing the seats 8 and other usual accessories. Through the wall 5 in rear of each auditorium 1 2 3 4 is an opening 9, which communicates with a common central chamber or space 10.

The circular platform $e$ is composed of the flooring 11, which is laid upon the joists 12, supported on suitable beams or rafters 12', the whole being firmly secured together and to girders 13, which are preferably fixed at their inner ends to and radiate from a central block or hub 14, made, preferably, in halves, secured to each other by bolts 15 and formed with a central circular hole 16, through which the column $b$ freely passes. On the under side of the central block 14 is formed a circular groove 17, which is concentric with the column $b$ and adapted to engage the balls 18, which have their bearing in a corresponding groove 17', formed in the base-plate $b'$ of the column $b$.

Fixed to the circular platform $e$, adjacent to its periphery and preferably to the under side of each girder 13, is a bracket 19, to which is axially pivoted an upright flanged wheel 20, adapted to travel on and around a circular rail or track 21, which is fixed on the floor $d$.

To the under side of the circular platform $e$, preferably to the under side of each girder 13 at a suitable distance from and concentric with the column $b$, is fixed a circular ring 22, (see particularly Fig. 5,) made in sections riveted or bolted together and formed on its under side with teeth 23, which are engaged by a correspondingly-toothed pinion 24, fixed on a horizontal shaft 25, which is mounted in bearings 26, having a base-plate 27 fixed to the floor *d*. On the shaft 25 is fixed a spur-wheel 28, which is engaged by a pinion 29, fixed on a shaft 30, the latter being mounted thereat in a bearing 31, dependent from the base-plate 27 and extending therefrom horizontally beneath the floor *d* to the outside of the wall *a*, where it is geared or connected in any suitable well-known manner to an electric or other suitable motor, (not shown,) the whole operating to rotate the circular platform *e* slowly on its ball and wheel bearings around the central fixed column *b* and circular track 21.

At a suitable distance from the inside of the wall *a* is arranged a sky-screen 32, which is preferably concentric with the circular platform *e*, between the periphery whereof and the sky-screen 32 the desired landscape or scenograph 33 is arranged.

By the above arrangement of the parts on slowly rotating the circular platform *e* an uninterrupted succession of scenery—such as that viewed on a journey across the American continent, Columbus's voyage across the Atlantic, or the like—is presented to the view of a spectator in either of the auditoriums 1 2 3 4 during a complete revolution or thereabout of the platform *e*.

At one part of the theater A is a covered passage-way 34, which communicates at one end through an opening 35 with the vestibule 36 and extends therefrom across the space between the wall *a* and the platform *e*. Through the inner end wall 37 of the passage-way 34, which is curved concentrically with the periphery of the circular platform *e*, are preferably two openings 38 and 39, which are at a suitable distance apart, so that when the proscenium-opening 7' of, say, the auditorium 1 is opposite to the openings 38 and 39 communication is established between the passage-way 34 and the auditorium 1, the opening 38 being used as the entrance from the passage-way 34 into the auditorium 1 and the opening 39 as the exit from the auditorium 1 to the passage-way 34, and so on in like manner as the auditoriums 2 3 4 are successively brought opposite to the openings 38 and 39 during the rotation of the platform *e*.

By means of the rear openings 9 from the auditoriums 1 2 3 4 and central chamber 10 exit is facilitated from the auditoriums through the openings 38 and 39 and passage-way 34 to the vestibule 36 in case of fire or other emergency.

Concentric with the platform *e* and encircling the auditoriums 1 2 3 4 at or proximate to the upper edge of the proscenium-openings 7' are arranged one or more circular rows of lights *f*, which are fixed to the under side of a circular and preferably inclined annular board *g*, suspended by a suitable frame *i* from the roof-trusses *c* of the main building A, whereby a continuous, uniform, or variable light effect is produced upon the landscape or scenograph 33, as desired.

What we claim as our invention, and desire to secure by Letters Patent, is—

1. In scenographic apparatus, the combination with an inclosed and revolving auditorium having an opening through one side, of a scenograph surrounding the said auditorium and having its consecutive portions only visible successively from the auditorium through the said opening during a complete revolution, or thereabout of the auditorium, substantially as described.

2. In scenographic apparatus, the combination with an inclosed and revolving auditorium having an opening through one side, of a scenograph, a building containing the said parts, and a row of lights dependent from the building and surrounding the said auditorium adjacent to the said opening, for producing variable light effects on the successive portions of the scenograph visible from the auditorium through the said opening, substantially as described.

In testimony whereof we have signed our names to this specification in the presence of the subscribing witnesses.

EDWARD J. AUSTEN.
HERBERT A. BRADWELL.

Witnesses to the signature of Edward J. Austen:
 EDWARD W. FARRELL,
 GEO. L. BELFRY.

Witnesses to the signature of Herbert A. Bradwell:
 FREDERICK NAPIER,
 CHAS. L. HAVENS.